United States Patent [19]

Kleeberg

[11] 4,164,698

[45] Aug. 14, 1979

[54] BATTERY CHARGING CIRCUIT

[75] Inventor: Heinz Kleeberg, Nuremberg, Fed. Rep. of Germany

[73] Assignee: Triumph Werke Nurnberg, A.G., Nuremberg, Fed. Rep. of Germany

[21] Appl. No.: 847,735

[22] Filed: Nov. 2, 1977

[30] Foreign Application Priority Data

Nov. 13, 1976 [DE] Fed. Rep. of Germany ....... 2651863

[51] Int. Cl.² ............................................... H02J 7/04
[52] U.S. Cl. ...................................... 320/2; 58/23 C; 320/40
[58] Field of Search .......................... 58/23 BA, 23 C; 320/2-4, 10, 22, 23, 39, 40, 57, 59, DIG. 2; 323/15, 22 Z

[56] References Cited

U.S. PATENT DOCUMENTS

| 3,205,422 | 9/1965 | Gold ...................................... 320/39 |
| 3,263,092 | 7/1966 | Knauss ............................... 323/22 Z |
| 3,312,889 | 4/1967 | Gold .................................. 320/40 X |
| 3,426,263 | 2/1969 | Hennigan et al. ................. 320/40 X |
| 3,979,656 | 9/1976 | Takeda et al. ....................... 58/23 C |

*Primary Examiner*—Robert J. Hickey
*Attorney, Agent, or Firm*—Brian L. Ribando

[57] ABSTRACT

A circuit for use in charging a battery from a current source, such as a solar cell, includes a Zener diode, a current limiting resistor in series with the Zener diode, and a switch which shunts the resistor. In periods of high current output from the solar cell, the resistor is shunted allowing the Zener diode to limit the charging current to the battery in order to prevent damage thereto. In periods of low current output from the solar cell, the resistor limits the power consumption of the Zener diode to insure sufficient power delivery to the battery.

3 Claims, 1 Drawing Figure

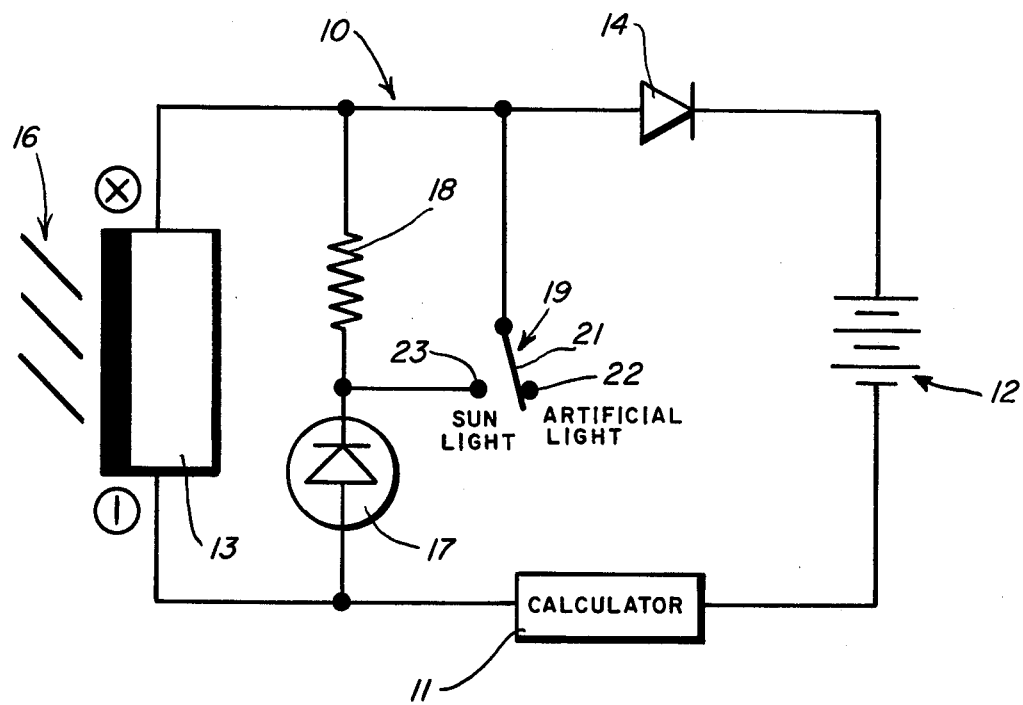

4,164,698

BATTERY CHARGING CIRCUIT

BACKGROUND OF THE INVENTION

The use of photoelectric devices or solar cells for the generation of charging currents for use in charging gastight (conventional dry, sealed) batteries in electronic pocket calculators, watches, or the like, is well known. When using such solar cells, it must be remembered, on one hand, that the charging current for the batteries must not exceed a certain limit or the battery will be damaged. On the other hand, in order to maintain proper functioning of the device which is powered by the battery, such as an electronic desk calculator, the current which is furnished by the solar cell should remain independent of the intensity of light which is incident thereon.

The use of a Zener diode connected in parallel to a battery to limit charging current applied to the battery to a predetermined value to avoid damage to the battery by the application of too high a current is well known. Such an arrangement is used when the photocell or solar cell will be exposed to strong light, such as direct sunlight. In a charging circuit for use with an electronic pocket calculator, the employing of a Zener diode in parallel to the battery to be charged results in a substantial disadvantage. When the intensity of light which is falling on the solar cell is substantially less the intensity of direct sunlight, the Zener diode consumes an amount of power which will be sufficient to prevent the battery from being properly charged.

SUMMARY AND OBJECTS OF THE INVENTION

The invention relates to a circuit arrangement for charging a gas-tight or sealed battery, and more particularly, to a circuit including a photocell and a Zener diode used for charging a battery in a pocket calculator or the like.

A photocell or solar cell generates current used to charge a battery and a Zener diode is connected in parallel to the battery for the protection thereof against destruction by a charging current developed when the photoelement is in direct sunlight, at which time the charging current may be too strong. Additionally, a resistor is arranged in series with the Zener diode, and a switch is provided to shunt the resistor when desired. When direct sunlight is incident on the solar cell, the diode will function in the normal manner to prevent high charging current from being applied to the battery. When the solar cell is in a lower intensity light, such as interior room illumination, the resistor in series with the diode limits the current which is drawn by the Zener diode, allowing a greater current to be applied to the battery in order to insure the proper charging thereof.

It is therefore an object of the invention to provide a charging circuit including a solar cell and a Zener diode for charging a battery powered device.

It is another object of the invention to provide a charging circuit comprising a solar cell, a Zener diode, and a current limiting resistor which may be shunted by a switch for use in charging a battery powered device.

These and other objects of the invention will become apparent from the following detailed description taken in conjunction with the accompanying drawing figures in which like reference numerals designate like or corresponding parts throughout the figures.

BRIEF DESCRIPTION OF THE DRAWING

FIG. 1 shows a circuit according to the invention.

DESCRIPTION OF THE PREFERRED EMBODIMENT

Referring now the the Figure, there is shown a charging circuit generally designated by the reference numeral 10. The circuit includes a current utilizing device 11 which may be an electronic calculator, an electronic watch, or the like. The device 11 is provided with power source 12 such as a gastight (conventional dry, sealed) battery. A circuit for maintaining a charge on the battery 12 includes a solar cell 13 and diode 14. When the solar cell is positioned to receive light energy designated generally by reference numeral 16, the light energy which is incident thereon will produce a charging current in a manner which is well known. A Zener diode 17 is connected in parallel with the gastight battery 12, and a current limiting resistor 18 is connected in series with the Zener diode 17. A switch 19 in parallel with resistor 18 may be used to shunt the resistor 18 from the circuit. The switch 19 comprises a movable element 21 which may be alternately positioned against one of two contacts 22 and 23. When the element 21 is positioned against contact 22, the switch 19 is open and the resistor 18 acts in series with Zener diode 17. When the element 21 is positioned against contact 23, the switch 19 is closed and the resistor 18 is shunted by a current path having relatively zero resistance. The switch 19 may be provided with suitable indicia to allow the user to determine the proper position of the switch in accordance with the nature of the light energy incident upon the cell 13.

The operation of the device is as follows. When the switch 19 is open, the resistor 18 limits the amount of current which may be drawn by the Zener diode 17. This insures that sufficient current will be applied to the battery 12 in order to maintain the same in a charged condition. This is important when, for instance, the device 11 together with the charging circuit 10 is in an area of low illumination, such as an interior room which is artificially lit. Under such conditions, the solar cell 13 produces a relatively low output. When the switch 19 is closed, the resistor 18 is effectively shunted from the circuit. With the resistor 18 shunted, the Zener diode acts in the normal way to limit the amount of charging current which is applied to the battery 12. This is important when the solar cell 13 is subjected to a very strong illumination, such as direct sunlight, in which instance the current output of the cell is high and care must be taken so that the battery does not become overcharged and subsequently damaged. It will be understood that the switch 19 may assume many forms, and may be mechanical or electronic in nature. Where an electronic type of switch is used, the switching may be effected by the level of incident light energy 16, in which case the functioning of the circuit is completely automatic.

I claim:

1. A circuit for supplying a charging current to a battery in a current utilizing device, the circuit comprising:

a solar cell for converting light energy into a charging current, means including a diode for coupling said charging current to said battery, a Zener diode for limiting the level of charging current coupled to said battery, a resistor in series with said Zener diode for limiting charging current drawn by said Zener diode during periods of low illumination, and a switch in parallel with said resistor, whereby said switch is operative to selectively shunt said resistor during periods of high illumination.

2. A circuit including a photoelectric device for supplying charging current to the battery of a current utilizing device and for maintaining the battery in a charged condition during periods of low illumination falling on said photoelectric device, the circuit comprising:

a solar cell having a high current output responsive to a high level of illumination and a low current output responsive to a low level of illumination, said solar cell converting light energy into a charging current and comprising the photoelectric device, means for coupling said charging current to said battery, a Zener diode in parallel with said battery for controlling the charging current coupled to said battery, a parallel combination of a switch and a resistor in series with said Zener diode, said resistor limiting the charging current drawn by said Zener diode during periods of low illumination and low current output whereby said battery is maintained in a charged condition, said switch shunting said resistor during periods of high illumination and high current output to limit charging current coupled to said battery and prevent the overcharging thereof.

3. The circuit of claim 2 wherein said switch is a manually operated switch.

* * * * *